US007453882B2

(12) United States Patent
Ho et al.

(10) Patent No.: US 7,453,882 B2
(45) Date of Patent: Nov. 18, 2008

(54) APPARATUS AND METHOD FOR ASYNCHRONOUSLY CONTROLLING DATA TRANSFERS ACROSS LONG WIRES

(75) Inventors: Ronald Ho, Mountain View, CA (US); Jonathan K. Gainsley, Mountain View, CA (US); Robert J. Drost, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 853 days.

(21) Appl. No.: 10/927,285

(22) Filed: Aug. 25, 2004

(65) Prior Publication Data

US 2005/0094619 A1 May 5, 2005

Related U.S. Application Data

(60) Provisional application No. 60/516,989, filed on Nov. 3, 2003.

(51) Int. Cl.
*H04L 12/28* (2006.01)
*G06F 3/00* (2006.01)

(52) U.S. Cl. ............... 370/395.1; 370/431; 710/20; 712/22

(58) Field of Classification Search ............ 370/395.1, 370/396, 400, 401, 431, 433, 434, 458, 459; 710/20, 21; 712/1, 10, 11, 18, 22, 25, 225
See application file for complete search history.

(56) References Cited

U.S. PATENT DOCUMENTS

| 4,719,621 | A | | 1/1988 | May ........................ 370/85 |
| 5,963,721 | A | * | 10/1999 | Shiell et al. ............... 710/305 |
| 6,070,200 | A | * | 5/2000 | Gates et al. ................ 710/20 |
| 6,182,203 | B1 | * | 1/2001 | Simar et al. ............... 712/22 |
| 6,381,692 | B1 | * | 4/2002 | Martin et al. ............. 712/244 |
| 2002/0116595 | A1 | * | 8/2002 | Morton ...................... 712/22 |

FOREIGN PATENT DOCUMENTS

EP 0 357 413 A3 8/1989

* cited by examiner

*Primary Examiner*—Aung S. Moe
*Assistant Examiner*—Kerri M Rose
(74) *Attorney, Agent, or Firm*—Park, Vaughan & Fleming LLP; Edward J. Grundler

(57) ABSTRACT

One embodiment of the present invention provides a system that asynchronously controls the sending of data items from a sender to a receiver. The system includes a data path between the sender and the receiver, a first control path between the sender and the receiver, and a second control path between the sender and the receiver. The first control path and the second control path alternately control the asynchronous transmission of consecutive data items on the data path between the sender and the receiver.

29 Claims, 5 Drawing Sheets

APPARATUS AND METHOD FOR ASYNCHRONOUSLY CONTROLLING DATA TRANSFERS ACROSS LONG WIRES

RELATED APPLICATION

This application hereby claims priority under 35 U.S.C. §119 to U.S. Provisional Patent Application No. 60/516,989, filed on 3 Nov. 2003, entitled, "Long Wires and Asynchronous Control," by inventor Robert J. Drost, which is incorporated herein by reference.

BACKGROUND

1. Field of the Invention

The present invention relates to integrated circuit design. More specifically, the present invention relates to an apparatus and a method for asynchronously controlling the transfer of data items from a sender to a receiver across a long signal line within an integrated circuit.

2. Related Art

As integrated circuit technologies produce progressively finer on-chip structures, the resistance of on-chip wires continues to grow. This trend dramatically increases the delay of long-haul wires relative to the delay of gates, hence making communication over long wires very expensive.

Circuit designers can mitigate this effect by inserting repeaters along a wire, so that data sent down the wire will be periodically "boosted" to increase transmission speed. While this well-known technique reduces delay, it does not easily improve bandwidth, since each repeater only amplifies and does not hold information.

Inserting latched repeaters along a wire can both improve delay and bandwidth, since each repeater can now also store information. But latched repeaters require a fast clock. Generating such a fast clock can be difficult and expensive. Designers, therefore, are considering moving towards asynchronous communication on long wires. With asynchronous communication, the elements on the long wires clock themselves.

FIG. 1 illustrates an asynchronous communication system that includes sending control stage 102, receiving control stage 104, sending data latch 106, and receiving data latch 108. In FIG. 1, control stage 102 is a sending control stage and control stage 104 is a receiving control stage. For the next wire to the right, stage 104 is a sending control stage.

Sending control stage 102 and receiving control stage 104 are coupled together through request line 112 and acknowledge line 110. Sending data latch 106 is coupled to receiving data latch 108 through data path 114. Note that data path 114 can include a plurality of data lines, each with its own sending data latch and receiving data latch.

The control stages 102 and 104 have inputs marked with triangles, and outputs, which have no triangles. A control stage will transmit a signal on each of its outputs only when all of its inputs have received a signal. The triangles on data latches 106 and 114 indicate clock signal inputs.

During operation, when data is available in sending data latch 106 and the first channel is available, sending control stage 102 sends a request signal on request line 112 and simultaneously causes sending data latch 106 to send a data item on data path 114. After a transit time, the request signal and the data item arrive at receiving control stage 104 and receiving data latch 108, respectively.

In response to the request signal, if the following channel is available, receiving control stage 104 causes the data to be latched into receiving data latch 108 and simultaneously sends an acknowledge signal on acknowledge line 110. After an additional transit time, the acknowledge signal arrives at sending control stage 102. When the acknowledge signal arrives at sending control stage 102, these steps can be repeated to send a subsequent data item from sending data latch 106 to receiving data latch 108.

A major drawback to this technique is that while the acknowledge signal is in-flight, data path 114 is idle. Thus, data path 114 is busy at most half of the time, and is hence significantly underutilized. Note that underutilization of data lines is a significant problem because it represents a bandwidth penalty of fifty percent. That is, without this underutilization, the datapath bandwidth could be twice as large.

Hence, what is needed is an apparatus and a method for asynchronous control of long wires without the problems described above.

SUMMARY

One embodiment of the present invention provides a system that asynchronously controls the sending of data items from a sender to a receiver. The system includes a data path between the sender and the receiver, a first control path between the sender and the receiver, and a second control path between the sender and the receiver. The first control path and the second control path alternately control the asynchronous transmission of consecutive data items on the data path between the sender and the receiver.

In a variation of this embodiment, the first control path includes a first request line for sending a first request signal from the sender to the receiver, and a first acknowledge line for returning a first acknowledge signal from the receiver to the sender. The second control path includes a second request line for sending a second request signal from the sender to the receiver, and a second acknowledge line for returning a second acknowledge signal from the receiver to the sender. By alternately using the first and second control paths to control sending consecutive data items between the sender and the receiver, the sender and receiver do not have to wait for a full round-trip delay time required to propagate request and acknowledgement signals between the sender and the receiver, but can instead send two data items on the data path within a single round-trip delay time.

In a further variation, the data path includes a plurality of data lines.

In a further variation, the request and acknowledge lines are merged onto a single physical wire, wherein requests and acknowledgements are sent as transitions or pulses down the wire.

In a further variation, a given data line in the plurality of data lines includes a first data latch at the sending end of the given data line controlled by the first control path, and a second data latch at the sending end of the given data line controlled by the second control path.

In a further variation, the given data line in the plurality of data lines includes a third data latch at a receiving end of the given data line controlled by the first control path; and a fourth data latch at the receiving end of the given data line controlled by the second control path.

In a further variation, the first control path and the second control path are coupled together in a manner that ensures that the first control path and the second control path alternately control the sending of consecutive data items on the data path.

In a further variation, the first control path and the second control path are coupled together using delay-matched alternation wires to ensure a substantially equal control time for the first control path and the second control path.

In a further variation, the system uses repeaters between a sending end of the data path and a receiving end of the data path.

In a further variation, the system includes logic stages within a control stage, between consecutive request/acknowledge wires.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Asynchronous Communication System

Figure 1:
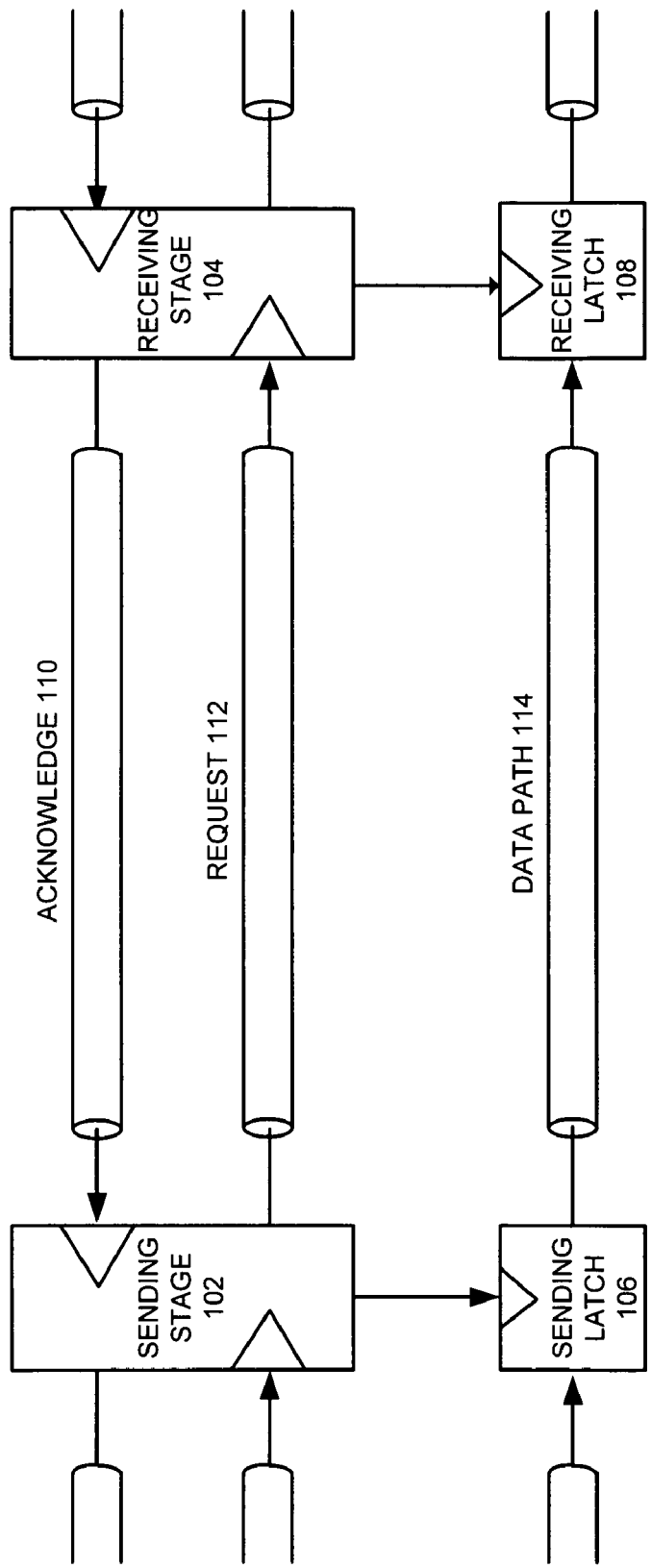
FIG. 1 illustrates an asynchronous communication system for communicating over long wires.
Figure 2:
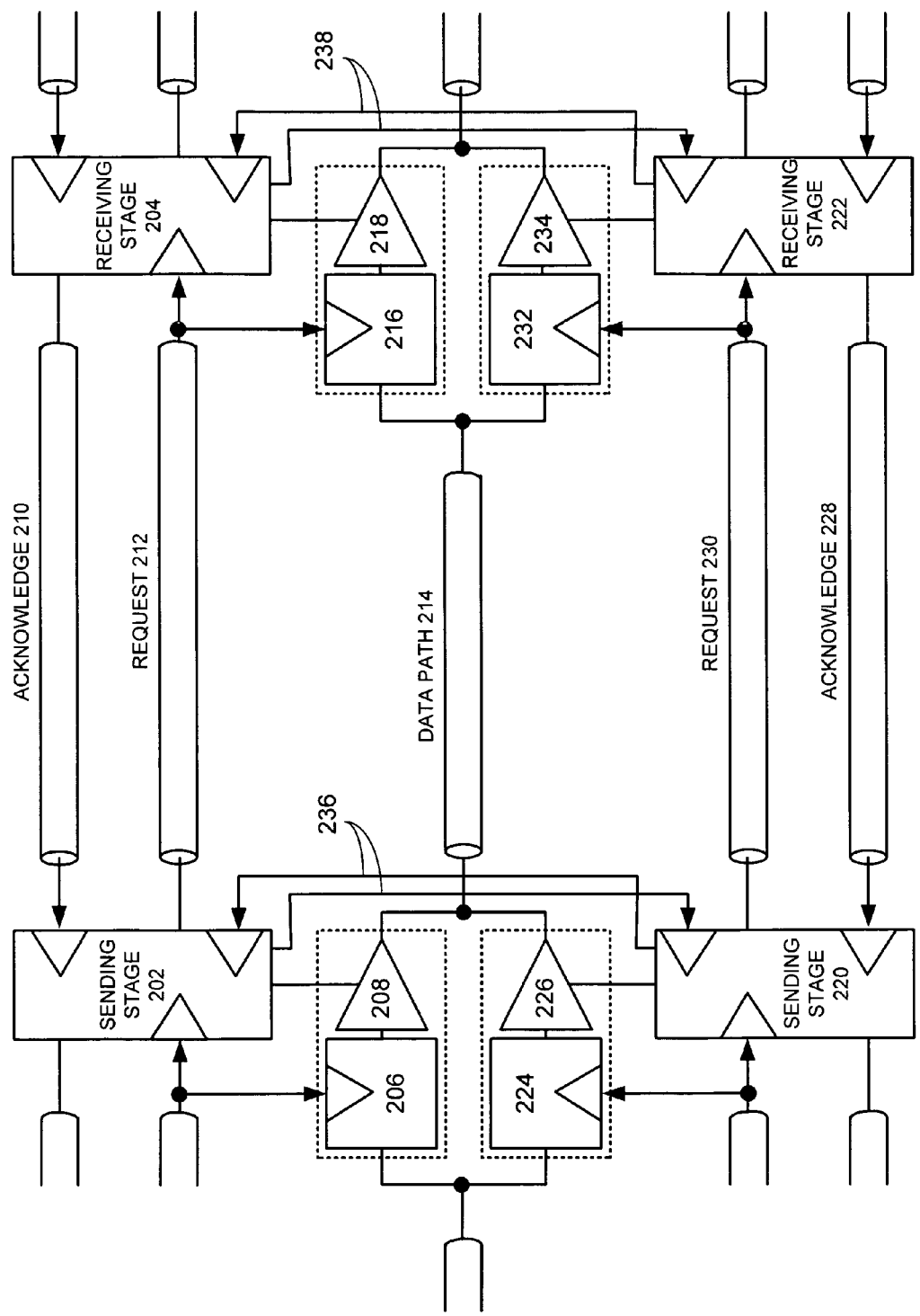
FIG. 2 illustrates an asynchronous communication system for communicating over long wires in accordance with an embodiment of the present invention.

FIG. 2 illustrates an asynchronous communication system for communicating over long wires in accordance with an embodiment of the present invention. This asynchronous communication system includes sending control stages 202 and 220, receiving control stages 204 and 222, sending data latches 206 and 224, receiving data latches 216 and 232, and multiplexing buffers 208, 226, 218 and 234.

In FIG. 2, stages 202 and 220 are sending control stages; and stages 204 and 222 are receiving control stages. With respect to the next set of wires down the system, stages 204 and 222 are sending control stages.

Sending control stage 202 and receiving control stage 204 are coupled by request line 212 and acknowledge line 210. Sending control stage 220 and receiving stage control 222 are coupled by request line 230 and acknowledge line 228. Sending data latches 206 and 224 are fed into multiplexing buffers 208 and 226, respectively, and are coupled to receiving data latches 216 and 232 by data path 214. Note that data path 214 can include a plurality of data lines each with respective sending data latches, multiplexing buffers, and receiving data latches. The outputs of receiving data latches 216 and 232 are fed into multiplexing buffers 218 and 234, respectively, which are coupled to a downstream stage.

During operation, when data is available in sending data latch 206 and the first channel is available, sending control stage 202 sends a first request signal on request line 212 and simultaneously causes multiplexing buffer 208 to send a data item onto data path 214. After a transit time, the first request signal and the first data item arrive at receiving control stage 204 and receiving data latch 216, respectively. Note that this is different from the prior art because we have multiplexing buffers after the latches.

In response to receiving the first request signal, data latch 216 latches the first data item. Also, if the following channel is available, receiving control stage 204 sends a first acknowledge signal on acknowledge line 210.

At the same time that the first acknowledge signal is sent on acknowledge line 210, if data is available in sending latch 224 and the second channel is available, sending stage 220 sends a second request signal on request line 230 and simultaneously causes multiplexing buffer 226 to send a second data item onto data path 214. In this way, data path 214 is able to transmit the second data item while the first acknowledge signal is in transit.

After a second transit time, the second request signal and the second data item arrive at receiving stage 222 and receiving data latch 232, respectively, and the first acknowledge signal arrives at sending stage 202.

In response to receiving the second request signal, data latch 232 latches the second data and if the following channel is available, receiving control stage 222 sends a second acknowledge signal on acknowledge line 228. When the first acknowledge signal arrives at sending stage 202, a third data item in sending data latch 206 can be sent from multiplexing buffer 208 to receiving data latch 216. By alternating control of data path 214 in this way, data path 214 is effectively used all of the time instead of only half of the time.

In FIG. 2, note that sending control stages 202 and 220 are cross-coupled by wires 236, and receiving control stages 204 and 222 are cross-coupled by wires 238, to ensure that the control stages alternate in controlling consecutive data transmissions across data path 214.

Delay-Matched Alternation Wires

Figure 3:
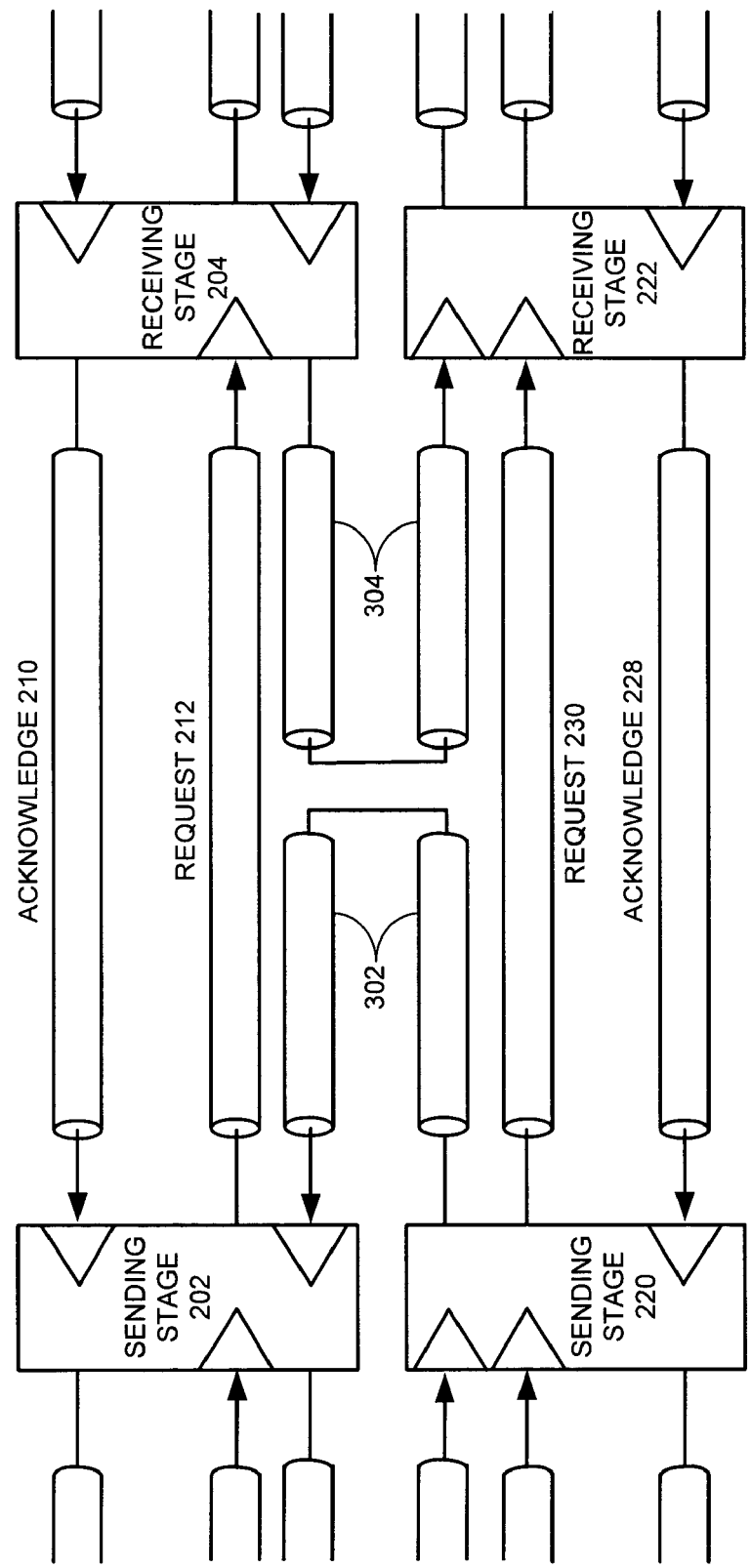
FIG. 3 illustrates the use of delay-matched alternation wires in accordance with an embodiment of the present invention.

FIG. 3 illustrates using delay-matched alternation wires in accordance with an embodiment of the present invention. The asynchronous communication system in FIG. 3 includes sending control stages 202 and 220, receiving control stages 204 and 222, and delay-matched alternation wires 302 and 304. Note that data path 214, sending data latches 206 and 224, receiving data latches 216 and 232, and buffers 208, 226, 218 and 234 are not illustrated in FIG. 3 to simplify the figure.

Sending control stage 202 and receiving control stage 204 are coupled by request line 212 and acknowledge line 210, and sending control stage 220 and receiving control stage 222 are coupled by request line 230 and acknowledge line 228. These components operate essentially as described above with reference to FIG. 2.

Delay-matched alternation wires 302 and 304 each have an effective delay that matches the transit time of request lines 212 and 230 and acknowledge lines 210 and 228. Matching the delay of the alternation signals between sending stages 220 and 202 and between receiving stages 204 and 222, ensures that the stages will wait for approximately one transit time on the long wires before switching.

Logic Stages within a Control Stage

Figure 4:
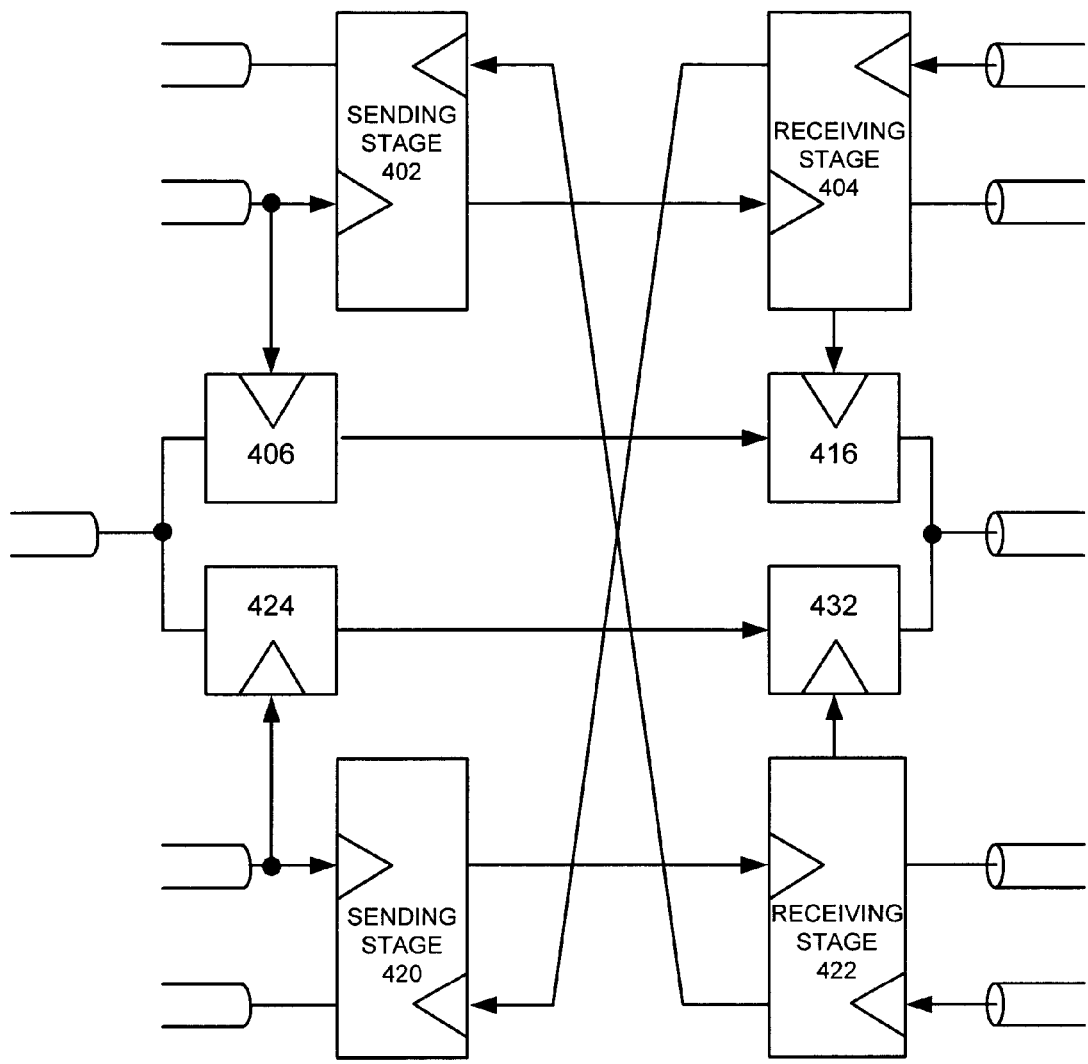
FIG. 4 illustrates the use of logic stages within a control stage in accordance with an embodiment of the present invention.

FIG. 4 illustrates the use of logic stages within a control stage in accordance with an embodiment of the present invention. Some applications may require combinational logic between long wires, such as conditional branching or merging of a FIFO stream, consequently necessitating multiple handshakes within a control stage. In these cases, the alternation can occur between stages as shown in FIG. 4. With additional delay in the control stage, this topology will prefer longer wire segments between handshake stages and higher total latency. It also requires separate request and acknowledgement wires within the multi-stage control stage.

The control stage shown in FIG. 4 includes sending stages 402 and 420, receiving stages 404 and 422, sending data latches 406 and 424 and receiving data latches 416 and 432. During operation, stages 402, 404, 420, and 422 and data latches 406, 424, 416, and 432 operate essentially as described above with reference to FIGS. 2 and 3. The acknowledge signals, however, are cross-coupled from receiving stage 404 to sending stage 420 and from receiving stage 422 to sending stage 402. Cross-coupling the control stages in this manner provides another method for ensuring the alternation of the control stages.

Communication over Long Wires

Figure 5:
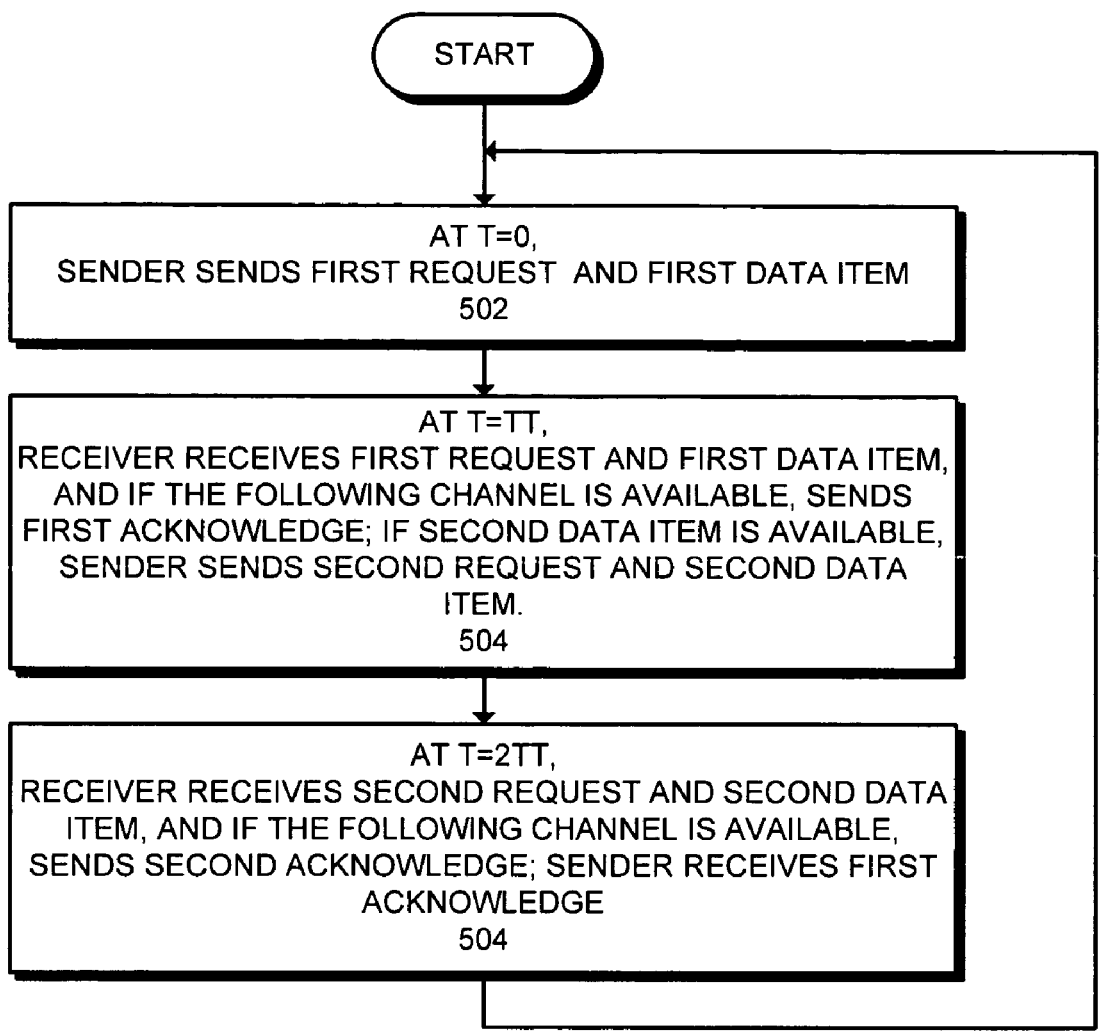
FIG. 5 presents a flowchart illustrating the process of communicating over long wires in accordance with an embodiment of the present invention.

FIG. 5 presents a flowchart illustrating the process of communicating over long wires in accordance with an embodiment of the present invention. The process is described in terms of the system shown in FIG. 2. The system starts at time=0 when sending control stage 202 sends a first request and multiplexing buffer 208 sends a first data item to the receiving end (step 502).

After a transit time between the sending end and the receiving end, receiving control stage 204 receives the first request and receiving data latch 216 receives the first data item. In response to receiving the first request, if the following channel is available, receiving control stage 204 sends a first acknowledge signal to sending control stage 202. Simultaneously with receiving control stage 204 sending the first acknowledge signal to sending control stage 202, sending control stage 220 sends a second request and sending multiplexing data buffer 226 sends a second data item to the receiving end (step 504).

After a second transit time, receiving control stage 222 receives the second request and receiving data latch 232 receives the second data item. In response to receiving the second request, if the following channel is available receiving control stage 222 sends a second acknowledge signal to sending control stage 220. Simultaneously, sending stage 202 receives the first acknowledge signal that was previously sent (step 504). This process continues in a ping-pong fashion while data items are available to send.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that asynchronously controls sending of data items from a sender to a receiver, comprising:
    a data path between the sender and the receiver;
    a first control path between the sender and the receiver;
    a second control path between the sender and the receiver;
    a delay-matched path coupled between the first control path and the second control path, wherein a propagation time for a signal transmitted in the delay-matched path is substantially equal to a propagation time for a signal transmitted in the first control path and the second control path, and
    wherein the first control path and the second control path alternately control asynchronous transmission of consecutive data items on the data path between the sender and the receiver.

2. The apparatus of claim 1,
    wherein the first control path includes,
        a first request line for sending a first request signal from the sender to the receiver, and
        a first acknowledge line for returning a first acknowledge signal from the receiver to the sender;
    wherein the second control path includes,
        a second request line for sending a second request signal from the sender to the receiver, and
        a second acknowledge line for returning a second acknowledge signal from the receiver to the sender;
    wherein by alternately using the first and second control paths to control sending consecutive data items between the sender and the receiver, the sender and receiver do not have to wait for a full round-trip delay time required to propagate request and acknowledgement signals between the sender and the receiver, but can instead send two data items on the data path within a single round-trip delay time.

3. The apparatus of claim 1, wherein the data path includes a plurality of data lines.

4. The apparatus of claim 3, wherein a given data line in the plurality of data lines further comprises:
    a first data latch at a sending end of the given data line controlled by the first control path; and
    a second data latch at the sending end of the given data line controlled by the second control path.

5. The apparatus of claim 4, wherein the given data line in the plurality of data lines further comprises:
    a third data latch at a receiving end of the given data line controlled by the first control path; and
    a fourth data latch at the receiving end of the given data line controlled by the second control path.

6. The apparatus of claim 1, wherein the first control path and the second control path are coupled together to ensure that the first control path and the second control path alternate control of the data path.

7. The apparatus of claim 6, wherein the first control path and the second control path are coupled together using delay-matched alternation wires.

8. The apparatus of claim 1, further comprising using repeaters between a sending end of the data path and a receiving end of the data path.

9. The apparatus of claim 1, wherein request and acknowledge lines share a single physical wire.

10. The apparatus of claim 1, wherein each control stage consists of multiple logic stages.

11. A method for asynchronously controlling sending of data items from a sender to a receiver, comprising:
    sending a first data item on a data path from the sender to the receiver and simultaneously sending a first request on a first control path from the sender to the receiver;
    after a first transit time has elapsed, receiving the first data item and the first request at the receiver;
    in response to receiving the first data item and the first request at the receiver, sending a first acknowledge signal on the first control path from the receiver to the sender;
    while the first acknowledge signal is in transit on the first control path, sending a second data item on the data path from the sender to the receiver and simultaneously sending a second request on a second control path from the sender to the receiver; and
    after a second transit time has elapsed, receiving the first acknowledge signal at the sender and receiving the second data item and the second request at the receiver;

in response to receiving the second data item and the second request at the receiver, sending a second acknowledge signal on the second control path from the receiver to the sender;

wherein the first control path and the second control path are coupled using a delay-matched path, wherein a propagation time for a signal transmitted in the delay-matched path is substantially equal to a propagation time for a signal transmitted in the first control path and the second control path, and wherein the first control path and the second control path alternately control sending consecutive data items on the data path.

12. The method of claim 11, wherein the first control path includes,
- a first request line for sending a first request signal from the sender to the receiver, and
- a first acknowledge line for returning the first acknowledge signal from the receiver to the sender;

wherein the second control path includes,
- a second request line for sending a second request signal from the sender to the receiver, and
- a second acknowledge line for returning the second acknowledge signal from the receiver to the sender;

wherein by alternately using the first and second control paths to control sending consecutive data items between the sender and the receiver, the sender and receiver do not have to wait for a full round-trip delay time required to propagate request and acknowledgement signals between the sender and the receiver, but can instead send two data items on the data path within a single round-trip delay time.

13. The method of claim 11, wherein the data path includes a plurality of data lines.

14. The method of claim 13, wherein a given data line in the plurality of data lines further comprises:
- a first data latch at a sending end of the given data line controlled by the first control path; and
- a second data latch at the sending end of the given data line controlled by the second control path.

15. The method of claim 14, wherein the given data line in the plurality of data lines further comprises:
- a third data latch at a receiving end of the given data line controlled by the first control path; and
- a fourth data latch at the receiving end of the given data line controlled by the second control path.

16. The method of claim 11, wherein the first control path and the second control path are coupled together to ensure that the first control path and the second control path alternate control of the data path.

17. The method of claim 16, wherein the first control path and the second control path are coupled together using delay-matched alternation wires.

18. The method of claim 11, wherein request and acknowledge lines share a single physical wire.

19. The method of claim 11, wherein each control stage consists of multiple logic stages.

20. An integrated circuit including a mechanism that asynchronously controls sending of data items from a sender to a receiver, comprising:
- a data path between the sender and the receiver;
- a first control path between the sender and the receiver;
- a second control path between the sender and the receiver;
- a delay-matched path coupled between the first control path and the second control path, wherein a propagation time for a signal transmitted in the delay-matched path is substantially equal to a propagation time for a signal transmitted in the first control path and the second control path, and
- wherein the first control path and the second control path alternately control asynchronous transmission of data items on the data path between the sender and the receiver.

21. The integrated circuit of claim 20, wherein the first control path includes,
- a first request line for sending a first request signal from the sender to the receiver, and
- a first acknowledge line for returning a first acknowledge signal from the receiver to the sender;

wherein the second control path includes,
- a second request line for sending a second request signal from the sender to the receiver, and
- a second acknowledge line for returning a second acknowledge signal from the receiver to the sender;

wherein by alternately using the first and the second control paths to control sending consecutive data items between the sender and the receiver, the sender and receiver do not have to wait for a full round-trip delay time required to propagate request and acknowledgement signals between the sender and the receiver, but can instead send two data items on the data path within a single round-trip delay time.

22. The integrated circuit of claim 20, wherein the data path includes a plurality of data lines.

23. The integrated circuit of claim 22, wherein a given data line in the plurality of data lines further comprises:
- a first data latch at a sending end of the given data line controlled by the first control path; and
- a second data latch at the sending end of the given data line controlled by the second control path.

24. The integrated circuit of claim 23, wherein the given data line in the plurality of data lines further comprises:
- a third data latch at a receiving end of the given data line controlled by the first control path; and
- a fourth data latch at the receiving end of the given data line controlled by the second control path.

25. The integrated circuit of claim 20, wherein the first control path and the second control path are coupled together to ensure that the first control path and the second control path alternate control of the data path.

26. The integrated circuit of claim 25, wherein the first control path and the second control path are coupled together using delay-matched alternation wires.

27. The integrated circuit of claim 20, further comprising using repeaters between a sending end of the data path and a receiving end of the data path.

28. The integrated circuit of claim 20, wherein request and acknowledge lines share a single physical wire.

29. The integrated circuit of claim 20, wherein each control stage consists of multiple logic stages.

* * * * *